(12) United States Patent
Imamura et al.

(10) Patent No.: US 6,986,555 B2
(45) Date of Patent: Jan. 17, 2006

(54) VEHICLE BRAKE CONTROL SYSTEM

(75) Inventors: Masamichi Imamura, Kanagawa (JP); Gen Inoue, Kanagawa (JP); Yukihiko Inoue, Kanagawa (JP); Chiharu Nakazawa, Kawasaki (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/412,285

(22) Filed: Apr. 14, 2003

(65) Prior Publication Data
US 2003/0205929 A1 Nov. 6, 2003

(30) Foreign Application Priority Data
Apr. 22, 2002 (JP) .............................. 2002-119091

(51) Int. Cl.
*B60T 8/34* (2006.01)
(52) U.S. Cl. ...................... 303/113.1; 303/15; 303/11; 303/116.2
(58) Field of Classification Search ................. 303/10, 303/11, 113.1, 113.2, 115.1, 115.2, 115.4, 303/116.1, 116.2, 15
See application file for complete search history.

(56) References Cited
U.S. PATENT DOCUMENTS

| | | | |
|---|---|---|---|
| 6,079,799 A * | 6/2000 | Sawada et al. ................ | 303/10 |
| 6,168,245 B1 * | 1/2001 | Siegel et al. .............. | 303/115.4 |
| 6,195,995 B1 * | 3/2001 | Bartsch ........................ | 303/10 |
| 6,199,958 B1 * | 3/2001 | Baechle ........................ | 303/10 |
| 6,347,843 B1 * | 2/2002 | Murayama et al. ...... | 303/116.1 |
| 6,702,402 B1 * | 3/2004 | Sawada et al. .......... | 303/113.1 |

FOREIGN PATENT DOCUMENTS

JP 9-226555 A 9/1997

* cited by examiner

*Primary Examiner*—Melanie Torres
(74) *Attorney, Agent, or Firm*—Foley & Lardner LLP

(57) ABSTRACT

A vehicle brake control system includes an electric fluid pump that, upon energization thereof, pumps brake fluid from a reservoir to a brake circuit at a position upstream of a pressure control valve, an inlet circuit connecting the inlet opening of the pump to a master cylinder, an inside gate valve installed in the inlet circuit, and a control unit that controls the pressure control valve, the inlet gate valve and the electric fluid pump and carries out a predetermined brake control to adjust the hydraulic pressure of the wheel cylinder by operating the pressure control valve. The control unit is configured to carry out a flow back control after completion of the predetermined brake control. The flow back control is a control wherein the inside gate valve is kept open having the electric fluid pump kept de-energized.

9 Claims, 5 Drawing Sheets

FLOW BACK CONTROL

FIG.5

VEHICLE BRAKE CONTROL SYSTEM

BACKGROUND OF THE INVENTION

1. Field of the Invention

The present invention relates in general to brake systems of wheeled motor vehicles, and more particularly to vehicle brake control systems of a type that increases the brake force applied to road wheels by actively feeding a brake fluid to a brake fluid circuit with the aid of an electric fluid pump.

2. Description of the Related Art

One of the vehicle brake control systems of the above-mentioned type is disclosed in Laid-open Japanese Patent Application (Tokkaihei) 9-226555. In this known system, a computer aided pressure control valve is employed, which suitably controls the hydraulic pressure applied to the wheel cylinder of each road wheel in accordance with running condition of an associated motor vehicle and driver's brake operation. With this control, undesired lock of the road wheels can be avoided (viz., anti-locking brake control (viz., ABS)) and unstable movement of the vehicle can be suppressed or at least minimized.

In this brake control, for reducing the hydraulic pressure in the wheel cylinder, the brake fluid is driven from the wheel cylinder to a reservoir. Furthermore, under pressure control, the brake fluid is fed back to the wheel cylinder as the occasion arises by operating an electric fluid pump.

Furthermore, upon completion of the brake control, the brake fluid left in the reservoir is enforcedly driven back to a master cylinder by operating the electric fluid pump for a certain time. This flow back operation effected by the electric fluid pump aims for keeping the capacity of the reservoir sufficient for a subsequent pressure control. That is, if a certain amount of brake fluid is left in the reservoir and thus the practical capacity of the same is not sufficient, the wheel cylinder can not have a sufficiently large pressure control range. Thus, to carry out the subsequent pressure control assuredly, the brake fluid left in the reservoir is enforcedly driven back to the master cylinder by operating the electric fluid pump as is mentioned hereinabove.

SUMMARY OF THE INVENTION

In the above-mentioned known vehicle brake control system, the brake fluid is driven back from the reservoir to the master cylinder each time the brake control is completed, and the flow back operation is carried out by operating or energizing the electric fluid pump for a certain time. However, as is known, energization of the electric fluid pump produces a certain noise that would make the vehicle passengers uncomfortable. Especially when the brake control system assumes an anti-locking brake control due to a sharp depression of a brake pedal, the noise produced by the electric fluid pump is heard much louder by the passengers because the vehicle would already stop at the time when the anti-locking brake control is completed. That is, when the vehicle stops, the vehicle cabin becomes quiet and thus the noise of the pump becomes conspicuous. If, for solving or minimizing such shortcoming, the time for energizing the electric fluid pump is shortened, sufficient driven back flow of the brake fluid to the master cylinder from the reservoir would not be obtained.

Accordingly, it is an object of the present invention to provide a vehicle brake control system which is free of the above-mentioned drawback.

According to the present invention, there is provided a vehicle brake control system which assuredly drives the brake fluid back to a master cylinder from a reservoir while suppressing generation of uncomfortable noise of an electric fluid pump.

According to a first aspect of the present invention, there is provided a vehicle brake control system which comprise a master cylinder for producing a master cylinder pressure when a brake pedal is depressed; a wheel cylinder for applying a brake force to a corresponding road wheel when applied with a hydraulic pressure; a brake circuit fluidly connecting the master cylinder and the wheel cylinder; a pressure control valve installed in the brake circuit to control the hydraulic pressure of the wheel cylinder; a reservoir into which a brake fluid is led from the wheel cylinder when the pressure control valve operates to reduce the hydraulic pressure of the wheel cylinder; an electric fluid pump that, upon energization thereof, pumps the brake fluid from the reservoir to the brake circuit at a position upstream of the pressure control valve; a first inlet circuit connecting an inlet opening of the electric fluid pump to the reservoir; a second inlet circuit connecting the inlet opening of the pump to the master cylinder; an inside gate valve installed in the second inlet circuit; and a control unit that controls the pressure control valve, the inlet gate valve and the electric fluid pump, the control unit carrying out a predetermined brake control to adjust the hydraulic pressure of the wheel cylinder by operating the pressure control valve, the control unit being configured to carry out a flow back control after completion of the predetermined brake control, the flow back control being a control wherein the inside gate valve is kept open having the electric fluid pump kept de-energized.

According to a second aspect of the present invention, there is provided a method for controlling a vehicle brake control system. The system comprises a master cylinder for producing a master cylinder pressure when a brake pedal is depressed, a wheel cylinder for applying a brake force to a corresponding road wheel when applied with a hydraulic pressure, a brake circuit fluidly connecting the master cylinder and the wheel cylinder, a pressure control valve installed in the brake circuit to control the hydraulic pressure of the wheel cylinder, a reservoir into which a brake fluid is led from the wheel cylinder when the pressure control valve operates to reduce the hydraulic pressure of the wheel cylinder, an electric fluid pump that, upon energization thereof, pumps the brake fluid from the reservoir to the brake circuit at a position upstream of the pressure control valve, a first inlet circuit connecting an inlet opening of the electric fluid pump to the reservoir, a second inlet circuit connecting the inlet opening of the pump to the master cylinder, and an inside gate valve installed in the second inlet circuit. The method comprises starting counting of a first given time upon sensing de-energization of the electric fluid pump due to completion of the predetermined brake control; opening the inside gate valve upon sensing completion of counting of the first given time; and keeping the inside gate valve open for a second given time keeping the electric fluid pump de-energized.

Other objects and advantages of the present invention will become apparent from the following description when taken in conjunction with the accompanying drawings.

DETAILED DESCRIPTION OF THE INVENTION

In the following, a vehicle brake control system according to the present invention will be described in detail with reference to the accompanying drawings.

Figure 1:
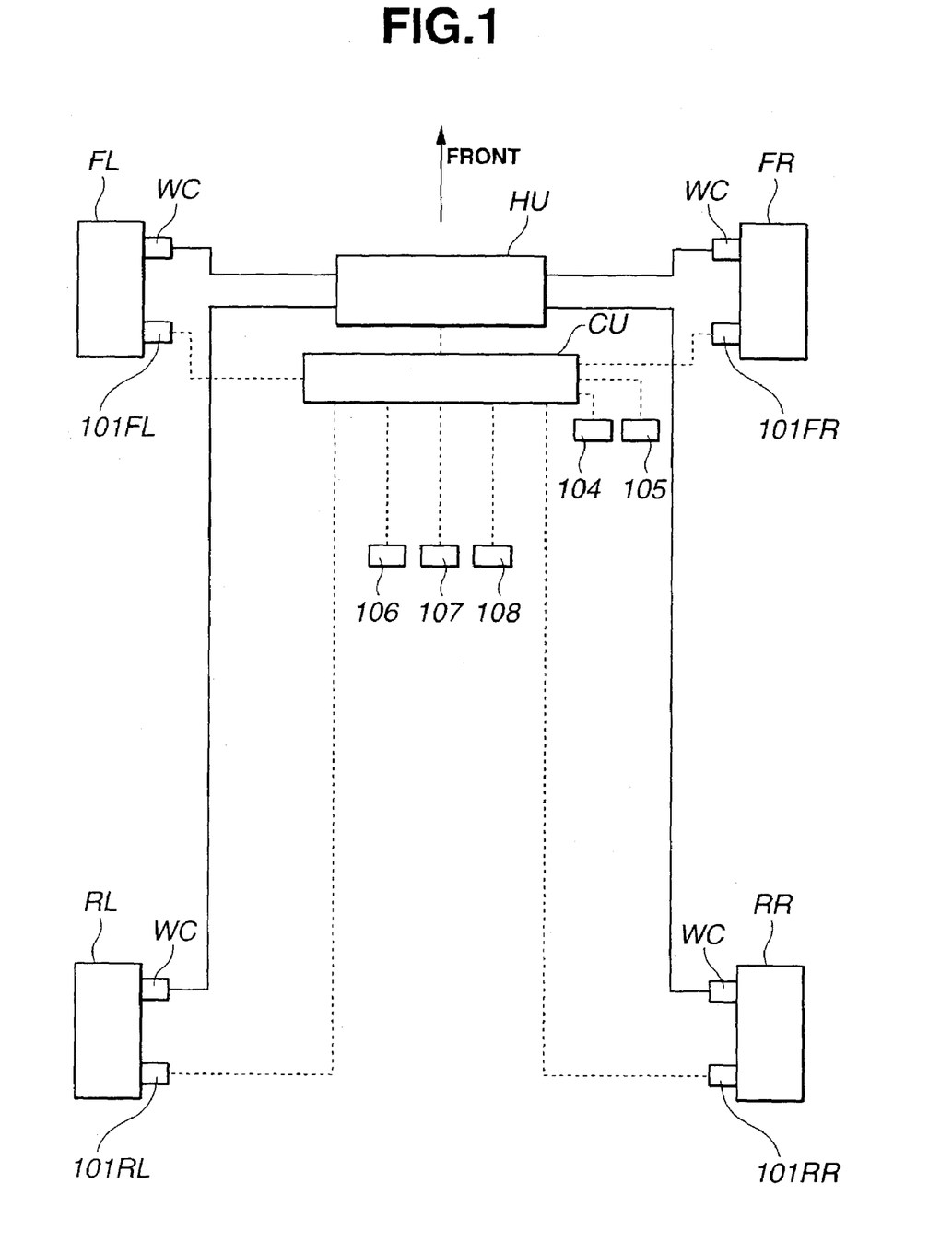
FIG. 1 is a block diagram of a vehicle brake control system of the present invention, which is practically applied to a four-wheel motor vehicle.

Referring to FIG. 1, there is schematically shown a four-wheel motor vehicle to which the brake control system of the present invention is practically applied.

As shown, the motor vehicle is equipped with four road wheels, which are front-right, front-left, rear-right and rear-left road wheels FR, FL, RR and RF. Each road wheel FR, FL, RR or RF is equipped with a wheel cylinder WC for hydraulically braking the associated road wheel.

These four wheel cylinders WC are fluidly connected to a brake force control device HU and controlled by the same. That is, hydraulic pressure in each wheel cylinder WC is controlled by control device HU. Operation of control device HU is controlled by a control unit CU which comprises a central processing unit (CPU), a random access memory (RAM), a read only memory (ROM) and inlet and output interfaces.

Into control unit CU, there are inputted various information signals, which are four signals from wheel rotation speed sensors 101FR, 101FL, 101RR and 101RL that respectively detect rotation speed of the four road wheels FR, FL, RR and RL, a signal from a steering angle sensor 104 that detects a steered angle of the vehicle (viz., steered angle of a steering wheel), a signal from a brake lamp switch 105 that detects ON operation (viz., depression) of a brake pedal, a signal from a deceleration sensor 106 that detects acceleration or deceleration of the vehicle, a signal from a lateral acceleration sensor 107 that detects a lateral acceleration of the vehicle and a signal from a yaw-angle velocity sensor 108 that detects a yaw-angle velocity of the vehicle.

In the following, the detail of brake force control device HU will be described with reference to FIG. 2 which shows only a half of a so-called X-type brake piping.

As is known, X-type brake piping has two mutually isolated brake circuits and these two brake circuits are arranged to cross each other like the character "X". That is, if one brake circuit is arranged to control wheel cylinders WC of front left and rear right road wheels FL and RR, the other brake circuit is arranged to control wheel cylinders WC of front right and rear left road wheels FR and RL.

Figure 2:
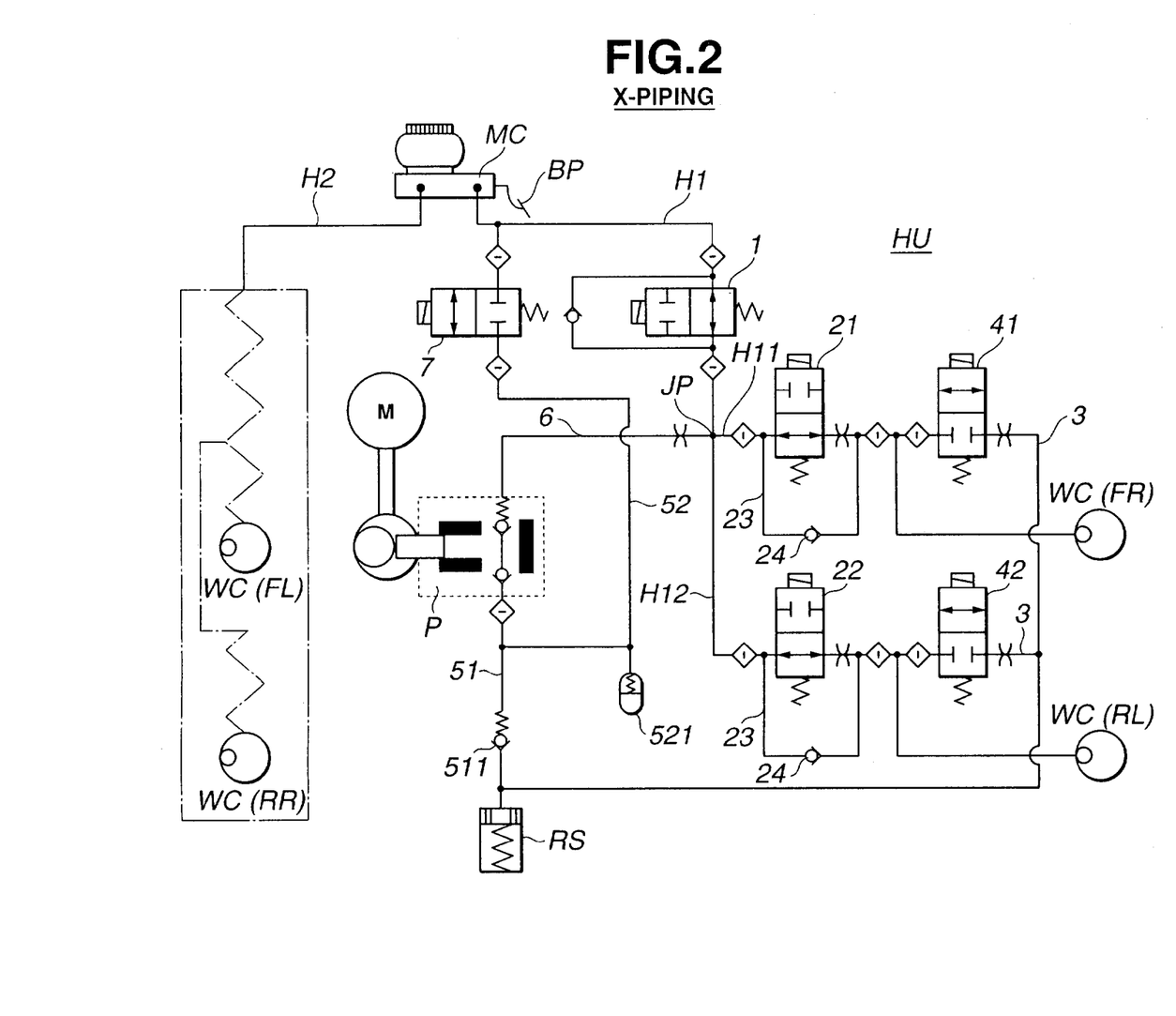
FIG. 2 is a block diagram of a brake force control device employed in the vehicle brake control system of the present invention.

As is seen from FIG. 2, brake force control device HU has two mutually isolated brake circuits H1 and H2.

Since the two brake circuits H1 and H2 have substantially the same arrangement, the following description will be directed to only the brake circuit H1 which controls wheel cylinders WC of front right and rear left road wheels FR and RL, for simplification of the description. That is, wheel cylinders WC of front left and rear right road wheels FL and RR are controlled by the other brake circuit H2, in substantially the same manner as will be described in the section of the brake circuit H1.

As is seen from FIG. 2, brake circuit H1 fluidly connects master cylinder MC to respective wheel cylinders WC of front right and rear left road wheels FR and RL. Brake circuit H1 has first and second branch circuits H11 and H12 which are connected to wheel cylinders WC of front right and rear left road wheels FR and RL, respectively. Thus, upon depression of brake pedal BP, pressurized brake fluid is led into these wheel cylinders WC while being controlled in an after-mentioned manner.

For ease of understanding, a zone of brake circuit H1 that is near master cylinder MC and a zone of brake circuit H1 that is near wheel cylinders WC will be referred to upstream and downstream zones of brake circuit H1 respectively.

As shown, at a zone of brake circuit H1 upstream of two branch circuits H11 and H12, there is installed an outside gate valve 1 of normally open type that opens when deenergized.

In first and second branch circuits H11 and H12, there are installed normally open inlet valves 21 and 22 respectively. As is known, the normally open valve 21 or 22 is an electromagnetic valve that opens when deenergized and closes when energized. Each branch circuit H11 or H12 has a bypass passage 23 that bypasses inlet valve 21 or 22, as shown. Each bypass passage 23 is equipped with a one-way valve 24 that is arranged to permit only an upstream fluid flow with respect to the associated inlet valve 21 or 22. Due to provision of such one-way valves 24, even when for example inlet valve 21 assumes its close position, the brake fluid can be fed back from wheel cylinder WC of front right road wheel FR to master cylinder MC when, after depression of brake pedal BP, the hydraulic pressure in master cylinder MC is lowered, as will be described in detail hereinafter.

Each branch circuit H11 or H12 has a drain circuit 3 that extends from inlet valve 21 or 22 to a reservoir RS. In each drain circuit 3, there is installed a normally closed outlet valve 41 or 42. As is known, the normally closed valve 41 or 42 is an electromagnetic valve that closes when deenergized and opens when energized.

Designated by reference P is an electric fluid pump that functions to control the pressure of brake fluid in brake circuit H1. As inlet side of an electric fluid pump P is connected to reservoir RS through a first inlet circuit 51, and connected to master cylinder MC through a second inlet circuit 52. An outlet circuit 6 extending from an outlet side of electric fluid pump P is connected to a junction portion JP where an outlet port of outside gate valve 1 and inlet ports of the normally open inlet valves 21 and 22 are connected. As is seen from the drawing, reservoir RS comprises a piston biased by a spring. Thus, containing the brake fluid in reservoir RS is made against a biasing force produced by the spring.

In first inlet circuit 51, there is installed a one-way valve 511 that is arranged to suppress a backflow of the brake fluid toward reservoir RS. In second inlet circuit 52, there is installed an inside gate valve 7 of normally close type that closes when deenergized. To second inlet circuit 52 at a position downstream of inside gate valve 7, there is connected a container 521 which has a spring biased diaphragm member installed therein. As is seen from the drawing, for driving electric fluid pump P, a motor M is used.

Thus, when, due to depression of brake pedal BP by a driver, a certain hydraulic pressure is produced by master cylinder MC, the vehicle brake control system of FIG. 1 can provide an anti-locking brake control mode for avoiding an undesired lock of road wheels FR, RL, FL and RR. That is, under such anti-locking brake control mode, inlet valves 21 and 22 and outlet valves 41 and 42 are suitably controlled having outside gate valve 1 kept open and inside gate valve 7 kept closed. With this control, the hydraulic pressure in the wheel cylinder of each road wheel FR, RL, FL or RR is adjusted to a desired value in a range from the atmospheric pressure to the pressure produced by master cylinder MC, thereby suppressing the lock of road wheel FR, RL, FL or RR. That is, anti-locking brake control is carried out.

If outside gate valve 1 is switched to a close position and inside gate valve 7 is switched to an open position, energization of electric fluid pump P provides brake circuit H1 with an increase in hydraulic pressure, and thus, brake force for road wheels FR and RL can be actively produced without the aid of master cylinder MC.

When, under this condition, inlet valves 21 and 22 and outlet valves 41 and 42 are suitably controlled, the hydraulic pressure in the wheel cylinder WC of each road wheel FR or RL can be controlled to a desired value. Furthermore, if, with inlet valves 21 and 22 kept opened, outside gate valve 1 is suitably controlled, the hydraulic pressure in the wheel cylinder WC of each road wheel FR or RL can be controlled to the desired value.

By using these controls, so-called vehicle stability control "VDC" and/or so-called vehicle traction control "TCS" is obtained. As is known, vehicle stability control "VDC" is a control wherein, for improving the vehicle stability by solving oversteer and/or understeer of the vehicle, road wheels FR, RL, FL and RR are automatically applied with a suitable brake force irrespective of whether brake pedal BP is depressed or not, and vehicle traction control "TCS" is a control wherein when drive road wheels are subjected to a slip, a suitable brake force is applied to the drive road wheels to avoid the slip.

Furthermore, if, with brake pedal BP kept depressed by the driver, the above-mentioned operation of the various valves 1, 7, 21, 22, 41 and 42 is effected, a so-called brake assist control is obtained wherein the hydraulic pressure in each wheel cylinder WC becomes higher than that produced by master cylinder MC.

The electric fluid pump P and valves 1, 7, 21, 22, 41 and 42 are controlled by control unit CU in such a manner as will be described in the following.

Figure 3:
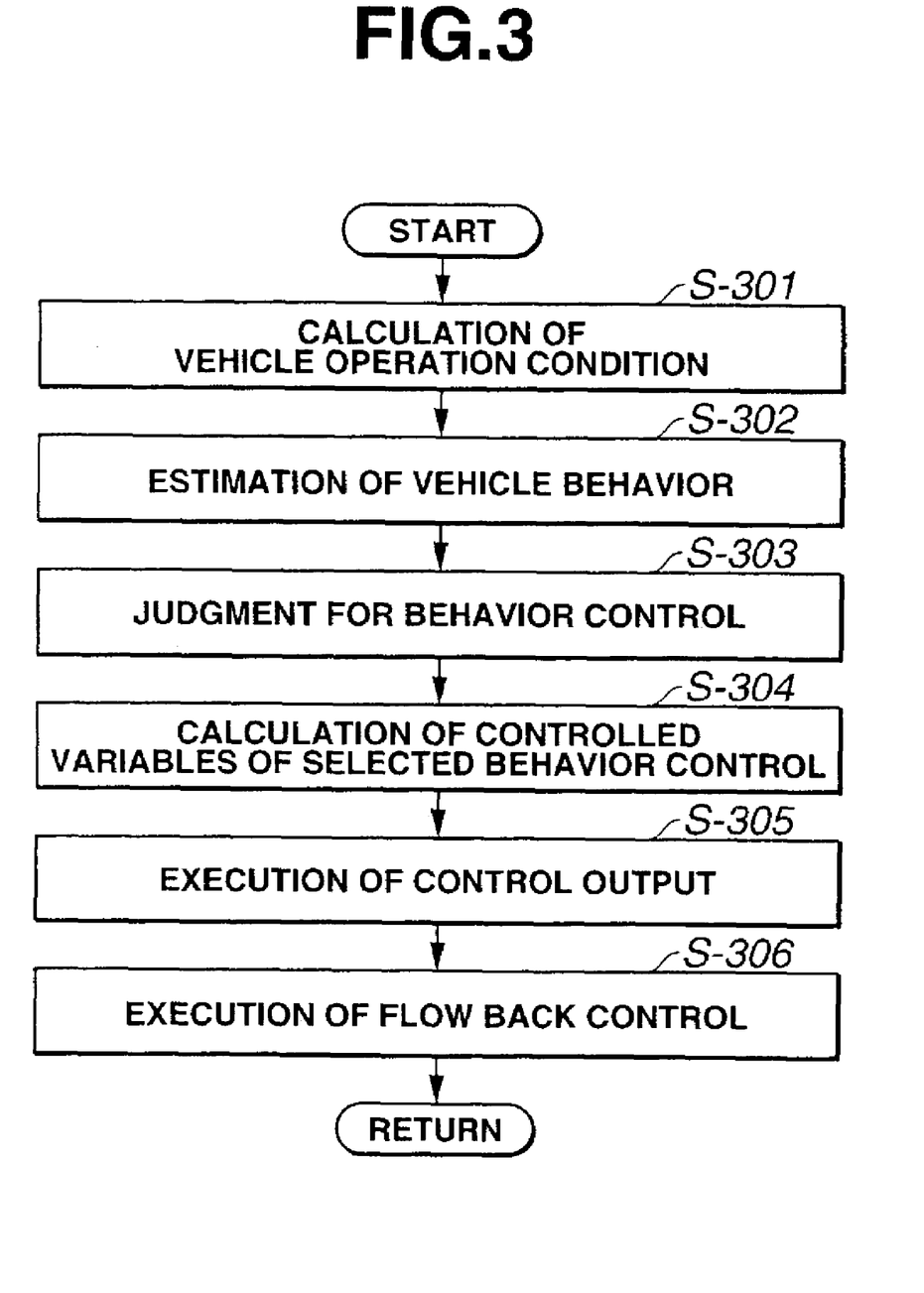
FIG. 3 is a flowchart depicting basic operation steps executed by the vehicle brake control system of the present invention.

First, basic control or basic operation steps effected by control unit CU will be described with reference to the flowchart of FIG. 3.

At step S-301, the operation condition of the motor vehicle is calculated by processing information signals issued from the above-mentioned various sensors 101FR, 101FL, 101RR, 101RL, 104, 105, 106, 107 and 108. Then, at step S-302, based on the vehicle operation condition thus calculated, the behavior of the motor vehicle is estimated. Then, at step S-303, judgment is made as to whether a behavior control is carried out or not. In the present invention, the behavior control is the vehicle traction control "TCS", anti-locking brake control "ABS" and/or vehicle stability control "VDC".

At step S-304, controlled variables of a selected behavior control whose operation is needed are calculated. The variables correspond to momenta of the electric fluid pump P and the valves 1, 7, 21, 22, 41 and 42. Then, at step S-305, in accordance with the controlled variables obtained at step S-304, control output is made to each controlled element, viz., P, 1, 7, 21, 22, 41 or 42. Then, at step S-306, a flow back control is executed which characterizes the present invention.

The detail of the flow back control will be described with reference to the flowchart of FIG. 4.

At steps S-401, S-402 and S-403, judgment is each carried out as to whether vehicle traction control "TCS", anti-locking brake control "ABS" or vehicle stability control "VDC" is being executed or not. If YES, that is, when one of the three controls "TCS", "ABS" and "VDC" is being executed, the operation flow goes to step S-405. At this step S-405, a first counter value "CNT1" is set to a predetermined time "CNT1sh". In the present invention, the time "CNT1sh" is determined to for example 500 msec (milliseconds).

As will become apparent as the description proceeds, the predetermined time "CNT1sh" corresponds to a time that is needed for executing a stop waiting control. That is, the predetermined time "CNT1sh" is greater than or equal to a period that elapses from a time when feeding of electric power to the electric fluid pump P (see FIG. 1) stops to a time when the pumping motion of the electric fluid pump P completely stops, but smaller than a time that has been hitherto needed for operating the electric fluid pump P after completion of a control. In view of this, preferably, the predetermined time "CNT1sh" should be smaller that 1500 msec.

Figure 4:
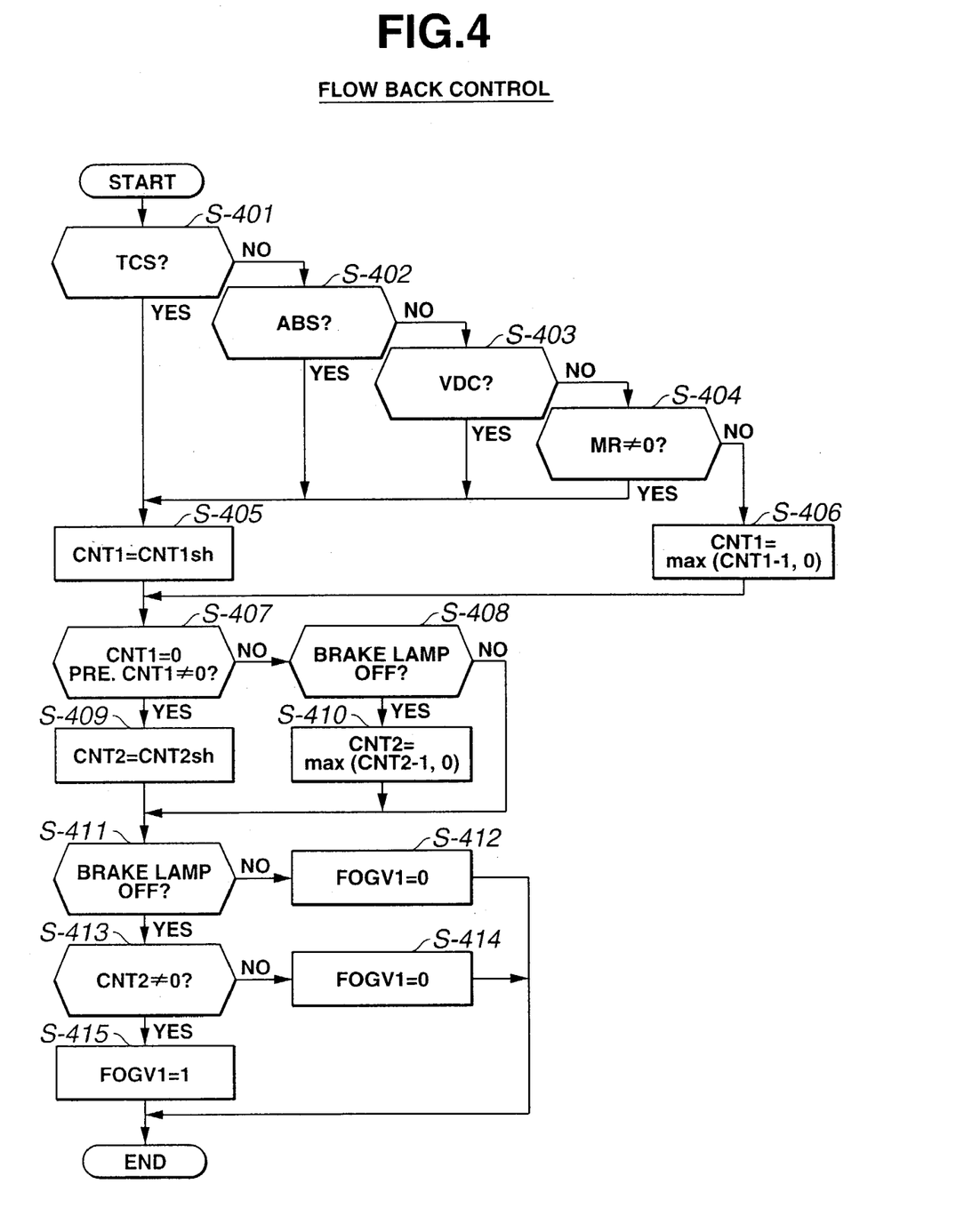
FIG. 4 is a flowchart depicting programmed operation steps of a flow back control, that are executed by a control unit employed in the vehicle brake control system of the present invention.

Referring back to the flowchart of FIG. 4, if NO-answer is issued at all of steps S-401, S-402 and S-403, that is, when neither of the above-mentioned three controls "TCS", "ABS" and "VDC" is being executed, the operation flow goes to step S-404. At this step S-404, judgment is carried out as to if a motor timer MR establishes "MR≠0 (zero)" or not. If motor timer MR establishes "MR≠0 (zero)", the operation flow goes to step S-405, while, if motor timer MR does not establish "MR≠0 (zero)", the operation flow goes to step S-406. The motor timer MR indicates a value that corresponds to a controlled variable of the electric fluid pump P (or motor M) among various controlled variables obtained at step S-404. Thus, while the motor timer MR indicates a value other than 0 (zero), an electric power is kept applied to the electric fluid pump P (or motor M).

Thus, when all the three controls "TCS", "ABS" and "VDC" are not being executed and no drive current is fed to the electric fluid pump P (or motor M), the operation flow goes to step S-406. At this step S-406, the first counter value "CNT1" is subjected to a decrement, that is, the value "VNT1" subtracted by 1 (one) (viz., "CNT1–1" is carried out), and thereafter smaller one between the value of "CNT1–1" and 0 (zero) is put to the first counter value "CNT1" as a renewed value.

Then, at step S-407, judgment is carried out as to whether the existing first counter value "CNT1" is 0 (zero) and whether the previous first counter value "CNT1" is not 0 (zero) or 0 (zero). That is, judgment is carried out as to whether the first counter value has become 0 (zero) or not in the present control routine. If YES, that is, when the first counter value has become 0 (zero) in the present control routine, the operation flow goes to step S409. At this step S-409, a second counter value "CNT2" is determined to a second predetermined time "CNT2sh". This second predetermined time "CNT2sh" takes a value that ranges from 500 msec to several seconds. That is, this second predetermined time "CNT2sh" is needed for executing the flow back control. As will be described in detail hereinafter, based on a fluid flow resistance produced at second inlet circuit 52 (see FIG. 2), inside gate valve 7 and the other parts, the second predetermined time "CNT2sh" is set to a time that assures a complete operation of the circular flow control effected by inside gate valve 7.

Referring back to the flowchart of FIG. 4, if, at step S-407 in the present control routine, "CNT1=0" is not made, the operation flow goes to step S-408. At this step S-408, judgment is carried out as to whether the brake lamp switch 105 is in OFF condition or not, that is, whether the brake pedal is not depressed or depressed. If YES, that is, when the brake lamp switch 105 is in OFF condition meaning non-depressed condition of the brake pedal, the operation flow goes to step S-410. At this step S-410, the second counter value "CNT2" is subjected to a decrement, that is, the value "CNT2" is subtracted by 1 (one) (viz., "CNT2−1" is carried out), and thereafter smaller one between the value of "CNT2−1" and 0 (zero) is put to the second counter value "CNT2" as a renewed value.

After step S-409 or step S-410, or upon receiving NO-answer at step S-408 (viz., when it is judged that the brake pedal is being depressed), the operation flow goes to step S-411. At this step S-411, judgment is carried out as to whether the brake lamp switch 105 is in OFF condition or not again. If YES, that is, when the brake pedal is not depressed, the operation flow goes to step S-413 to carry out judgment as to whether the second counter value "CNT2" is not 0 (zero) or 0, that is, whether "CNT2≠(zero)" is established or not. Thus, if YES is made at step S411 (viz., when brake pedal is not depressed) and YES is made at step S-413 (viz., when it is judged that the second counter value "CNT2" is not 0 (zero)), the operation flow goes to step S-415 to set a flag "F0GV1" of flow back control to 1 (one), that is, to establish "F0GV1=1". While, if NO is made at step S-411 (viz., when brake pedal is being depressed), or NO is made at step S-413 (viz., when it is judged that the second counter value "CNT2" is 0 (zero)), the operation flow goes to step S-412 or S-414, as shown. At this step S-412 or S-414, the flag "F0GV1" of flow back control is reset to 0 (zero), that is, "F0GV1=0" is established.

When "F0GV1=1" is established, electric power is fed to inside gate valve 7 to open the same thereby to carry out the flow back control. While, when "F0GV1=0" is established, no electric power is fed to inside gate valve 7 thereby to close the same.

In the following, an exemplified operation of the vehicle brake control system of the present invention will be described with reference to the time-chart of FIG. 5.

In this operation, the vehicle stability control "VDC" is carried out at first, then, the anti-locking brake control "ABS" is carried out and then the flow back control is carried out.

As is seen from the time-chart, at time "t1", the vehicle stability control "VDC" is started. For this control, electric fluid pump P (or motor M, see FIG. 2) is energized, inside gate valve 7 is opened and outside gate valve 1 is closed. With this operation, the brake fluid in master cylinder MC is drawn by electric fluid pump P through second inlet circuit 52 and discharged to the brake circuit H1 and fed to wheel cylinders WC of road wheels FR and RL (and FL and RR) through inlet valves 21 and 22. With this brake fluid feeding, a suitable brake force is applied to a selected road wheel or road wheels to produce a yaw-moment that functions to improve the vehicle stability. Under this vehicle stability control "VDC", the operation flow takes a route that includes NO-answer at step S-401, NO-answer at step S402 and YES-answer at S-403, as viewed in the flowchart of FIG. 4, and the operation flow goes to step S-405. Thus, under this vehicle stability control "VDC", the first counter value "CNT1" is renewed to the predetermined time "CNT1sh".

Figure 5:
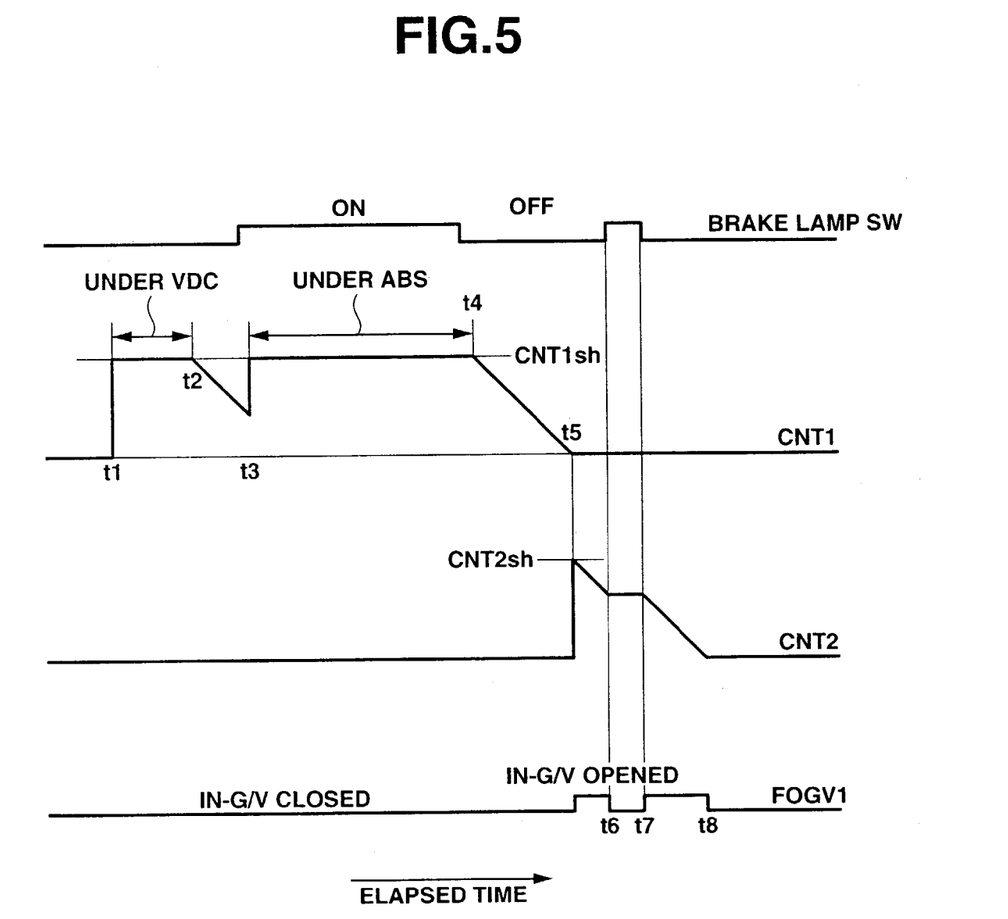
FIG. 5 is a time-chart depicting operation of elements that is carried out when the flow back control is executed.

Referring back to the time-chart of FIG. 5, at time "t2", the vehicle stability control "VDC" is finished, and thus, the drive instruction signal to electric fluid pump P (viz., motor M) is stopped, that is, "MR=0" is established. Upon this, the stop waiting control begins starting the decrement of the first counter value "CNT1". In this stop waiting control, time counting is continued until the first counter value "CNT1" becomes 0 (zero) (viz., "CNT1=0"). During this, the operation flow takes a route that includes NO-answer at step S-407, NO-answer at step S-408 and NO-answer at step S-411, as viewed in the flowchart of FIG. 4, and the operation flow goes to step S-412. Thus, the flag "FGV1" of flow back control is reset to 0 (zero), that is, "F0GV1=" is established. Thus, inside gate valve 7 is not opened under operation of the circular flow control.

As is understood from the time-chart of FIG. 5, in the present invention, at time "t3" that is prior to a time when the flow back control would be actually carried out upon occurrence of "CNT1=", the anti-locking brake control "ABS" is started. Upon this, the stop waiting control is cancelled.

Under operation of the anti-locking brake control "ABS", inlet valves 21 and 22 (see FIG. 2) of road wheels FR and RL (and FL and RR) that are about to be locked are closed and at the same time outlet valves 41 and 42 of them are opened to reduce the hydraulic pressure in the corresponding wheel cylinder or cylinders WC. With this pressure lowering operation, the locking tendency of the corresponding road wheel or wheels is removed, and thereafter, inlet valves 21 and 22 are opened and outlet valves 41 and 42 are closed to increase the hydraulic pressure of wheel cylinder or cylinders WC for increasing the brake force of the corresponding road wheel or wheels. By repeating the pressure reduction and pressure increase in the above-mentioned manner, effective braking is obtained while avoiding undesired locked condition of the road wheel or wheels. Under this anti-locking brake control "ABS", the operation flow takes a route that includes NO-answer at step S-401 and YES-answer at step S-402 as viewed in the flowchart of FIG. 4, and the operation flow goes to step S-405 to reset the first counter value "CNT1" to the predetermined time "CNT1sh".

Referring back to the time-chart of FIG. 5, at time "t4", the anti-locking brake control "ABS" is finished and thus "MR=0" is established. Upon this, due to the stop waiting control, decrement of the first counter value "CNT1" starts. Then, at time "t5", the first counter value "CNT1" becomes 0 (zero) finishing the stop waiting control. Then, following a route of operation flow that includes YES-answer at step S-407, the operation flow goes to step S-409 to set the second counter value "CNT2" to the predetermined time "CNT2sh" (viz., "CNT2=CNT2sh" is established). Thereafter, unless the brake pedal is depressed, the operation flow takes a route that includes NO-answer at step S-407 and YES-answer at step S-408, and goes to step S-410 to start decrement of the second counter value "CNT2", and the operation flow takes a route that includes YES-answer at step S-411 and YES-answer at step S-413, and goes to step S-415 to set the flag "F0GV1" of flow back control to 1 (one) (viz., establishment of "F0GV1=1"). Upon this, inside gate valve 7 is opened and the flow back control is started.

If a certain amount of brake fluid is left in reservoir RS, opening the inside gate valve 7 forces the brake fluid to flow from reservoir RS back to master cylinder MC through second inlet circuit 52 because the hydraulic pressure in reservoir RS shows a positive degree that is higher but slightly than the atmospheric pressure that is exerted in master cylinder MC. In this case, there is no need of energizing electric fluid pump P (or motor M) and thus there is no possibility of producing uncomfortable noise by electric fluid pump P.

It is to be noted that the predetermined time "CNT2" of the second counter value "CNT2" is set to a value that assures a full-returning of the brake fluid filling the reservoir RS from the reservoir RS to the master cylinder MC.

In the time-chart of FIG. 5, there is shown an exemplified case wherein at time "t6" in the middle of operation of the flow back control, the brake pedal is depressed by a driver. In this case, as viewed in the flowchart of FIG. 4, the operation flow takes a route that includes NO-answer at step S-407 and NO-answer at step S-408 and goes to step S-411 interrupting the decrement of the second counter value "CNT2", and the operation flows takes a route that includes NO-answer at step S-411 and goes to step S-412 resetting the flag "F0GV1" of flow back control to 0 (zero) (viz., establishing "F0GV1=0"). With this, inside gate valve 7 becomes closed, and thus, the master cylinder pressure is fed to the wheel cylinder or cylinders WC without being fed to second inlet circuit 52.

Referring back to the time-chart of FIG. 5, when, thereafter, the brake pedal is released at time "t7", the operation flow (see FIG. 4) takes a route that includes NO-answer at step S-407 and YES-answer at step S-408 and goes into step S-410 reopening the decrement of the second counter value "CNT2", and the operation flow takes a route that includes YES-answer at step S411 and YES-answer at step S-413 and goes to step S-415 setting the flag "F0GV1" to 1 (one) (viz., establishing "F0GV1= 1"). With this, inside gate valve 7 is opened again thereby reopening the operation of the flow back control.

Referring back to the time-chart of FIG. 5, when, thereafter, the second counter value "CNT2" becomes 0 (zero), that is, when "CNT2=0" is established at time "t8", the operation flow (see FIG. 4) takes a route that includes YES-answer at step S-411 and NO-answer at step S-413 and goes to step S-414 resetting the flag "F0GV1" to 0 (zero). With this, inside gate valve 7 is closed and thus the flow back control is finished.

As is described hereinabove, in the present invention, upon completion of a certain brake control, such as antilocking brake control "ABS", vehicle stability control "VDC" and vehicle traction control "TCS", that needs a so-called escaping flow of the brake fluid from the wheel cylinder WC to the reservoir RS for reducing the pressure in the cylinder WC, waiting is made for a certain time (viz., from 500 msec to 1500 msec) for executing the stop waiting control and upon completion of the stop waiting control, the flow back control is started having inside gate valve 7 opened, so that the brake fluid left in reservoir RS is returned to master cylinder MC without aid of operation of the power of electric fluid pump (or motor M). Upon completion of the flow back control, the electric fluid pump P (or motor M) may be energized for a while for assisting the flow back control.

Accordingly, in accordance with the present invention, the flow back of the brake fluid from reservoir RS to master cylinder MC is achieved without aid of electric fluid pump P or by operating electric fluid pump P (or motor M) for only a short time. Thus, in the invention, the time for which uncomfortable noise is produced is removed or at least reduced, which solves or at least minimizes un-comfortableness felt by the passengers.

If the brake pedal is depressed by a driver during the flow back control, this control is interrupted closing inside gate valve 7. Accordingly, in such case, the master cylinder pressure is not fed to second inlet circuit 52, and after completion of the brake pedal depression by the driver, the flow back control is restarted and continued until second counter value "CNT2" shows 0 (zero). Thus, also in this case, the brake fluid in reservoir RS can be returned to master cylinder MC assuredly.

In the following, modifications of the present invention will be described.

Although the above description is directed to an arrangement wherein the pressure control of one wheel cylinder WC is effected by two valves, that are, inlet valve 21 (22) and outlet valve 41 (42), the pressure control may be made by only one valve so long as it can selectively assume an inlet state, an outlet state and a holding state.

Furthermore, if desired, other fluid may be used in place of the brake fluid.

Although the above description is directed to X-type brake piping, other type piping may be used in the present invention, which is for example a piping wherein wheel cylinders of the two front road wheels and those of the two rear road wheels are isolated, a piping wherein wheel cylinders of the two right road wheels and those of the two left wheels are isolated or a piping wherein wheel cylinders of all of the four road wheels are isolated.

It is to be noted that the time (viz., CNT1sh) for executing the stop waiting control and the time (viz., CNT2sh) for executing the flow back control are not limited to the above-mentioned values. That is, such times (viz., CNT1sh and CNT2sh) should be suitably determined in accordance with the nature of the brake mechanism and electric fluid pump P.

The entire contents of Japanese Patent Application 2002-119091 (filed Apr. 22, 2002) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A vehicle brake control system comprising:
a master cylinder for producing a master cylinder pressure when a brake pedal is depressed;
a wheel cylinder for applying a brake force to a corresponding road wheel when applied with a hydraulic pressure;
a brake circuit fluidly connecting the master cylinder and the wheel cylinder;
a pressure control valve installed in the brake circuit to control the hydraulic pressure of the wheel cylinder;
a reservoir into which a brake fluid is led from the wheel cylinder when the pressure control valve operates to reduce the hydraulic pressure of the wheel cylinder;
an electric fluid pump that, upon energization thereof, pumps the brake fluid from the reservoir to the brake circuit at a position upstream of the pressure control valve;
a first inlet circuit connecting an inlet opening of the electric fluid pump to the reservoir;
a second inlet circuit connecting the inlet opening of the pump to the master cylinder;
an inside gate valve installed in the second inlet circuit; and
a control unit that controls the pressure control valve, the inside gate valve and the electric fluid pump, the control unit carrying out a predetermined brake control to adjust the hydraulic pressure of the wheel cylinder by operating the pressure control valve, the predetermined brake control being at least one of anti-locking brake control (ABS), vehicle stability control (VDC), and vehicle traction control (TCS), that receives a flow of the brake fluid from the wheel cylinder to the reservoir with assistance of the electric fluid pump for reducing the hydraulic pressure of the wheel cylinder, the control unit being configured to carry out a flow back control after completion of the predetermined brake control, the flow back control being a control wherein the inside gate valve is kept open, and the control unit being configured to close the inside gate valve to interrupt the flow back control when the brake pedal is depressed and configured to open the inside gate valve to carry out the flow back control when the brake pedal is left undepressed.

2. A vehicle brake control system as claimed in claim 1, in which the control unit is configured to carry out the flow back control for a given time.

3. A vehicle brake control system as claimed in claim 1, in which the control unit is configured to interrupt the flow back control when the brake pedal is depressed.

4. A vehicle brake control system as claimed in claim 1, in which the control unit is configured to start the flow back control upon completion of a stop waiting control, the stop waiting control being a control for delaying starting of the flow back control by a given time that is needed by the electric fluid pump for completely stopping operation thereof after completion of the predetermined brake control.

5. A vehicle brake control system as claimed in claim 4, in which the given time is shorter than 1500 milliseconds.

6. A vehicle brake control system as claimed in claim 4, in which the given time is approximately 500 milliseconds.

7. A vehicle brake control system as claimed in claim 4, in which the given time needed for delaying starting of the flow back control is a time that would elapse from a time when the electric fluid pump is de-energized to a time when operation of the electric fluid pump completely stops.

8. A vehicle brake control system as claimed in claim 1, wherein the flow back control is a control wherein the inside gate valve is kept open with the electric fluid pump kept de-energized.

9. A vehicle brake control system as claimed in claim 1, further comprising:

a flow back path between the reservoir and the master cylinder, in which the inside gate valve is provided on the flow back path, wherein the flow back path provides a connectivity between the master cylinder and the reservoir to thereby cause the flow back control to occur.

* * * * *